March 29, 1966     H. M. AIKIN     3,243,365
ELECTRODE FOR ELECTROLYTIC HOLE DRILLING
Filed May 7, 1962     3 Sheets-Sheet 1
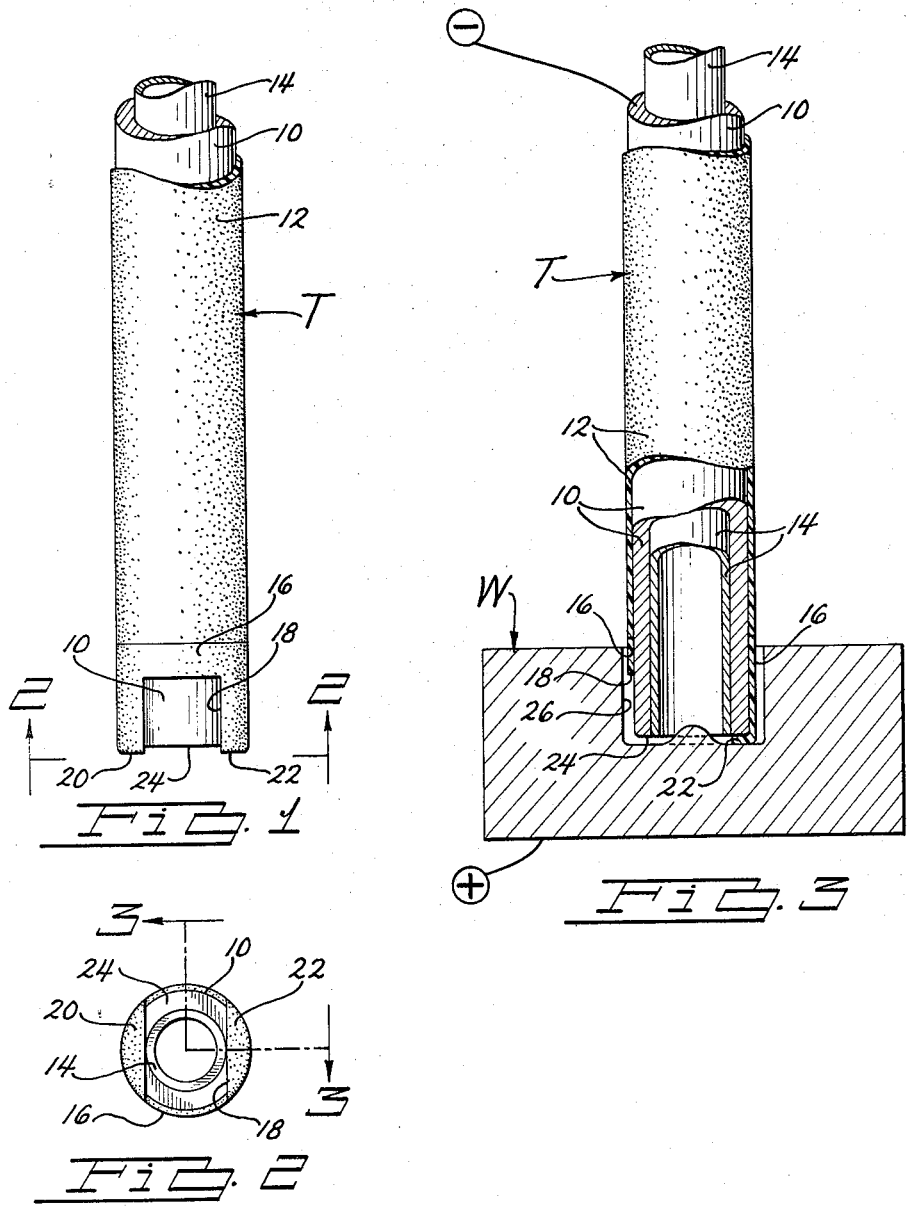
INVENTOR.
HAROLD MAX AIKIN
BY
Bower & Patalidis
ATTORNEYS March 29, 1966    H. M. AIKIN    3,243,365
ELECTRODE FOR ELECTROLYTIC HOLE DRILLING
Filed May 7, 1962    3 Sheets-Sheet 2

INVENTOR.
HAROLD MAX AIKIN
BY
Bower & Patalidis
ATTORNEYS

March 29, 1966 H. M. AIKIN 3,243,365
ELECTRODE FOR ELECTROLYTIC HOLE DRILLING
Filed May 7, 1962 3 Sheets-Sheet 3
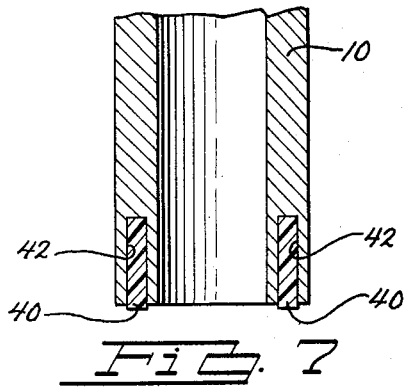
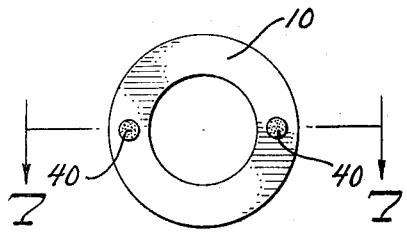
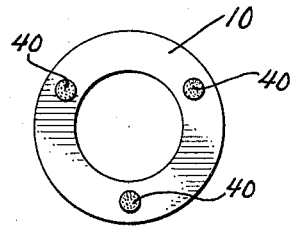
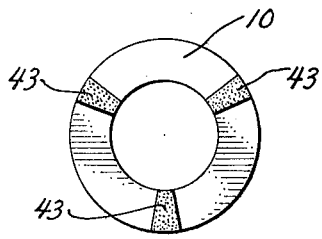
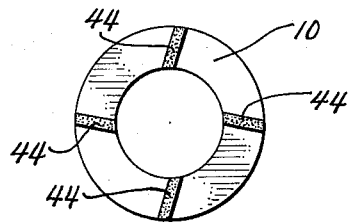
INVENTOR.
HAROLD MAX AIKIN
BY
Bower & Patalidis
ATTORNEYS United States Patent Office 3,243,365
Patented Mar. 29, 1966

3,243,365
ELECTRODE FOR ELECTROLYTIC HOLE
DRILLING
Harold Max Aikin, Sidney, Ohio, assignor to
Ex-Cell-O Corporation, Detroit, Mich.
Filed May 7, 1962, Ser. No. 192,837
4 Claims. (Cl. 204—290)

This invention relates to electrolytic removal of material from a workpiece and more particularly to electrode tools for electrolytic hole drilling. Electrolytic machining of metals, sometimes called electro-chemical machining, is rapidly coming into extensive use particularly on occasion where the work is difficult to be produced by ordinary machining methods, is composed of a material that is hard to machine by conventional tools and the finished article must be free from the mechanical and thermal strains and deformations which may result from the use of conventional cutting tools.

Hole drilling operations, or cavity sinking operations where the shape of the cavity conforms to a volume of revolution, may be effected by conventional methods by means of a rotating tool such as a drill or boring tool having integral or inserted cutting and chip removal working edges. Equivalent machining operations by electrolytic means are generally effected by a non-rotating cathodic electrode tool connected to the negative terminal of an electrical D.C. source, while the anodic workpiece is connected to the positive terminal of the same D.C. source. The electrode tool end tip is brought in close proximity to the workpiece and an electrolyte is supplied to the interface between the tool end working tip and the workpiece and allowed to circulate rapidly through that interface or gap. Material is removed from the workpiece by electrolytic action, and the electrode tool is advanced in order to maintain the spacing, or gap, between the tool end tip and the portion of the workpiece being eroded away by electrolytic action. A feed mechanism must be provided for the tool in order to maintain the rate of material removal substantially constant and also in order to reestablish an interface gap providing for the electrolytic erosion to be accomplished in the most efficient conditions, while, at the same time, too great a rate of feed must be avoided in order to prevent direct contact between the electrode tool working end and the workpiece which would result in damaging short circuiting of the electrical current or in objectionable arcing. The feed mechanism requires elaborate and delicate servo systems with sensitive feedback devices, with the resulting complication and cost factors generally associated with such mechanisms.

The principal object of the present invention is therefore to provide an electrolytic metal removal tool for drilling holes or circular shaped cavities in a workpiece without requiring complicated and expensive feed mechanism for advancing the tool and maintaining a constant interface between the tool tip and the surface of the workpiece in the process of being eroded away.

Another object of the present invention is to provide a tool for electrolytic metal removal which has built-in insulating and bearing portions for maintaining the appropriate interface gap between the tool active end tip and exposed portions and the workpiece surface.

A further object of the present invention is to provide an electrode tool which is substantially simple in structure and easy to manufacture.

Yet another object of the present invention is to provide an electrode tool for electrolytic removal which may be mounted on a simple and easily available machine such as an ordinary lathe or a drill press.

Still a further object of the present invention is to provide an electrode tool of the character indicated which can not be damaged by direct contact with the workpiece, which is subject only to a small rate of wear and which can be easily renovated when worn beyond usefulness.

In the drawings:

FIGURE 1 is a partial side elevation of a preferred embodiment of an electrode tool constructed according to the principles of the present invention;

FIGURE 2 is an end view of the end tip face of the tool of FIGURE 1, as viewed from line 2—2 of FIGURE 1;

FIGURE 3 is a partial longitudinal sectional view of the tool of FIGURE 1, taken along line 3—3 of FIGURE 2;

FIGURE 6 is a modification of the end tip face of the tools of FIGURES 1–5;

FIGURE 7 is a partial longitudinal section along line 7—7 of FIGURE 6;

FIGURE 8 is another modification of a tool tip face according to the present invention;

FIGURE 9 is still another modification of a tool tip face; and

FIGURE 10 is a further modification of a tool tip face.

Figure 4:
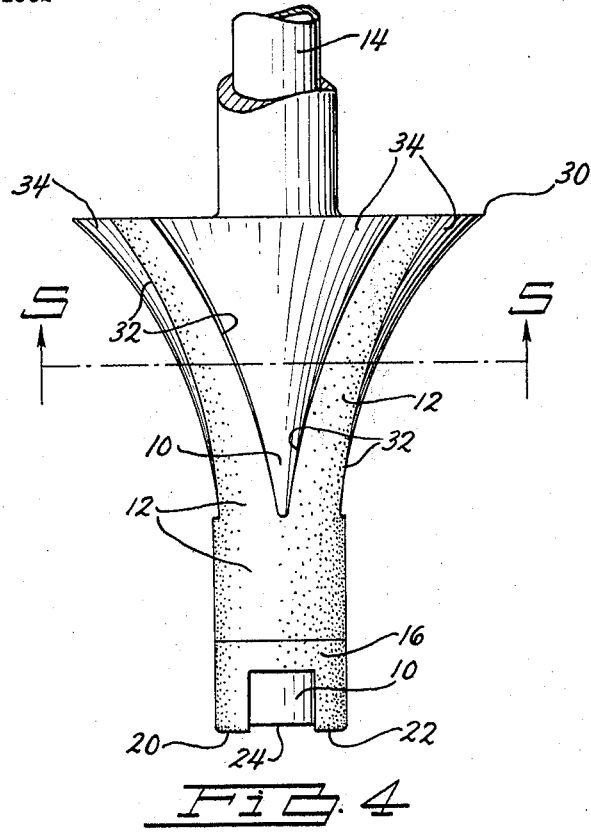
FIGURE 4 is a side elevation view of a modification of the invention, showing how the principles of the invention are used to machine non-cylindrical holes.

Referring now to the drawings, and more particularly to FIGURES 1–3 thereof, the electrode tool T of the invention comprises a tubular right circular cylindrical metal electrode 10, preferably covered on its exterior surface by a sleeve or coating 12 made of insulating material. A metal hollow insert 14, made of stainless steel or any other material showing resistance to corrosion by the particular electrolyte used in the electrolytic machining operation, may advantageously be placed to line the interior of the tubular metal electrode 10, although such a hollow insert is generally not absolutely necessary.

The insulating sleeve or coating 12 covering the body portion of the tubular electrode 10 extends short of the end portion thereof which is covered by an insulating and bearing insert 16 presenting cut-out portions 18 leaving segments of the electrode 10 apparent. Integral flange portions or spacers 20 and 22 of the insulating and bearing insert 16 cover part of the annular active end tip 24 of the tubular metal electrode tool, as shown particularly in FIGURES 2 and 3. The thickness of the flange portions or spacers 20–22 is such as to maintain the annular active end tip 24 of the electrode tool a predetermined distance away from the surface of the workpiece W. An appropriate gap spacing is thus automatically maintained between the tool annular end tip and the work for proper electrolytic action across the electrolyte solution flowing under pressure through the hollow core of the electrode tool and circulating in the interface between the tool annular end and the workpiece.

In order to obtain uniform electrolytic removal of material from the workpiece, the electrode tool which may be held in the chuck of a simple machine such as, for example, a drill press, is rotated preferably at a slow speed in the order of 10 to 50 revolutions per minute. The electrode tool T is connected to the negative terminal of a low voltage, preferably less than 25 volts, direct current power supply and the workpiece W is connected to the positive terminal of the power supply, as schematically shown in FIG. 3. The electrical connection to the electrode tool T may be effected by any conventional means such as a slip-ring contact, and the like. A slight pressure is applied on the tool to maintain the insulating and bearing flange portions or spacers 20–22 in contact with the workpiece surface. The surface of the workpiece W opposing the active end tip annular face 24 of the electrode tool is eroded by electrolytic action, and a cavity conforming to the tool size and shape is progressively shaped into the workpiece (FIGURE 3). The walls 26 of the cavity are eroded to a predetermined correct diameter by the electrolytic action taking place between the active segments of the electrode tool left uncovered by the cut-out portions 18 of the insulating and bearing insert 16 and the surface of the workpiece in regard thereof, the space between the tool and the workpiece being filled with the electrolyte solution flowing from the hollow core of the tool. By appropriate proportioning of the areas of the bare segments of the electrode tool, and by proper balance between the current density and the thickness of the material of the insulating and bearing insert 16, a certain amount of relative clearance can be controllably maintained between the size of the tool and the size of the cavity in the workpiece. It is obvious that, where so desired, the insulating and bearing insert 16 may be made without cut-out portions in order to restrict the active working surface of the tool to the end tip face 24.

Insert 16 may also be made in such a way as to be replaceable when the flange portions or spacers 20–22 have worn beyond their usefulness to maintain a proper gap spacing. Or, alternately, the tool may be renovated by grinding the material of the active end tip face 24 back of the amount required to reestablish a correct gap. The tool may even be renovated by reversal of current, for a short period of time, between the tool and the workpiece, specially in applications where bare portions of the tool are limited to the end tip face.

Figure 5:
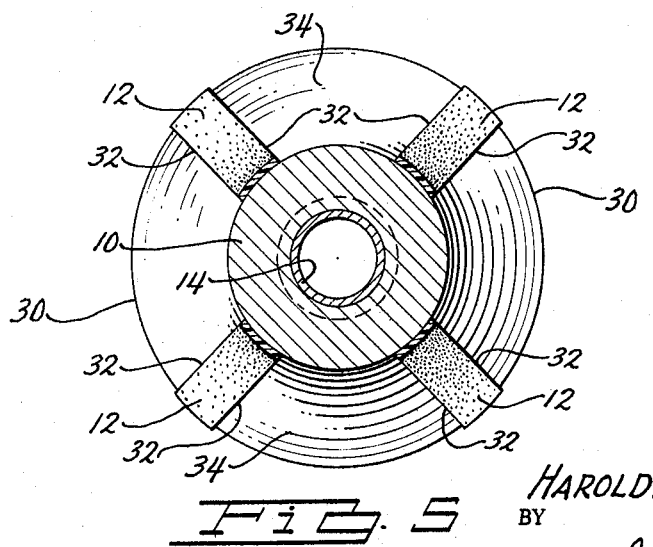
FIGURE 5 is a transverse cross sectional view along line 5—5 of FIGURE 4.

The principles of the invention can easily be applied to an electrode tool used for sinking cavities other than right circular cylindrical holes. An instance of such a tool is illustrated by FIGURES 4–5, wherein a tool is provided with a diameter which increases from its end portion proximate the end tip 24 to its other end 30 according to the shape of the cavity to be obtained. The insulating sleeve or coating 12 presents, on its side surface, a plurality of cutout portions, such as 32, leaving unprotected segments, such as 34, of the cathode tool, which start substantially from where the diameter of the tool begins to increase. These bare segments enable the tool to erode and enlarge the cavity in the workpiece according to the required contour.

The annular active end tip face of electrode tools constructed according to the teachings of the present invention may, alternatively, be provided with cylindrical insulating and bearing spacers 40 (FIGURES 6–7) inserted in appropriate longitudinal bores 42 in the active end tip of the tubular tool. Two such inserts may be used, or three, as shown in FIGURE 8, or any appropriate number.

Alternately, the active end tip of the tubular electrode tool may be provided with insulating and bearing inserts of any desirable shape such as inserts 43 of FIGURE 9 and 44 of FIGURE 10, fitted or bonded in appropriate longitudinal slots or apertures in the electrode tool active end.

The outside surface of the electrode tools of FIGURES 6–10 may also be coated, where so desired, with an insulating material as explained in reference to the tool illustrated in FIGURES 1–3, and the interior surface may also be similarly coated, in which case a solid core of material is trepanned from the workpiece.

The electrode tool per se is generally made of metals such as bronze, copper, steel, stainless steel, etc., or, in some applications, may even be made of carbon. The insulation sleeve or coating and the insulating and bearing inserts are advantageously made of materials such as tetrafluoroethylene, epoxy resins, phenolic resins, etc. The insulating sleeve or coating may also consist of a ceramic or vitrified enamel. The thickness of the insulating and bearing inserts or the distance by which the active face of the electrode tool is to be set back from the supporting face plane of the inserts is comprised between .0004 in. and .020 in., and preferably between .0004 in. and .005 in.

For the sake of simplifying the foregoing description, it has been assumed that the electrode tool was rotated in relation to the workpiece. It is obvious that the same results would be achieved if the tool was maintained stationary and the workpiece was rotated in relation therewith, or yet if rotary motions were imparted to both the tool and the workpiece in opposite directions or at different angular velocities. The expression "rotating" or "rotatable" electrode tool, wherever used in the description and in the appended claims, is therefore to be construed as a term of description and not as a term of limitation.

From the above description of the invention which has been illustrated as incorporated in several typical alternative structures, it will be apparent that modifications may be made without departing from the spirit and scope of the invention as defined in the appended claims.

What is claimed as new and useful is:

1. An electrode tool for electrolytic hole sinking into a conductive workpiece by electrolyzing current in the presence of an electrolyte, said electrode tool and said workpiece being normally rotated relatively to each other, said electrode tool comprising:
   a conductive tubular member having a hollow core for passage of electrolyte therethrough and being provided with a substantially circularly disposed outer surface;
   said tubular member having a body portion and an end portion;
   said body portion being covered with an insulation on the outer surface thereof;
   said end portion having a substantial axial length and being covered with an insulation on the outer surface thereof, said insulation having cut-out portions providing recessed electrically conductive exposed portions of said outer surface circumferentially disposed thereabout; and
   an annular end surface of said end portion being provided with portions covered with insulation in alternate arrangement with recessed electrically conductive exposed portions.

2. The electrode tool of claim 1 wherein the recessed electrically conductive exposed portions are recessed between about .0005 in. and .02 in. relatively to the portions covered with insulation.

3. The electrode tool of claim 1 wherein the body portion has a diameter increasing from proximately said end portion to the other end thereof, and wherein said body portion of increasing diameter is provided with portions covered with insulation in alternate arrangement with recessed electrically conductive exposed portions.

4. The electrode tool of claim 3 wherein the recessed electrically conductive exposed portions are recessed between about .0005 in. and .02 in. relatively to the portions covered with insulation.

References Cited by the Examiner

UNITED STATES PATENTS

| | | | |
|---|---|---|---|
| 2,750,332 | 6/1956 | Miller | 204—224 |
| 2,848,410 | 8/1958 | Knuth-Winterfeldt | 204—224 |
| 2,946,731 | 7/1960 | Falls | 204—143 |
| 3,058,895 | 10/1962 | Williams | 204—224 |
| 3,071,521 | 1/1963 | Ehrhart | 204—224 |
| 3,120,482 | 2/1964 | Williams | 204—143 X |

FOREIGN PATENTS 335,003  9/1930  Great Britain.

JOHN H. MACK, *Primary Examiner.*

MURRAY TILLMAN, *Examiner.*

R. GOOCH, R. K. MIHALEK, *Assistant Examiners.*